United States Patent [19]
Ooji

[11] Patent Number: 5,442,537
[45] Date of Patent: Aug. 15, 1995

[54] METHOD FOR SETTING OPERATION CONSTANTS IN AN INVERTER DEVICE

[75] Inventor: Masataka Ooji, Kawasaki, Japan

[73] Assignee: Fuji Electric Co., Ltd., Kanagawa, Japan

[21] Appl. No.: 219,835

[22] Filed: Mar. 29, 1994

Related U.S. Application Data

[63] Continuation-in-part of Ser. No. 41,234, Apr. 1, 1993, abandoned.

[51] Int. Cl.⁶ .............................. H02M 1/12
[52] U.S. Cl. .................................... 363/43
[58] Field of Search ............ 363/40, 43, 95, 97; 318/778, 779; 364/978.1, 978.2

[56] References Cited

U.S. PATENT DOCUMENTS

| | | | |
|---|---|---|---|
| 4,080,554 | 3/1978 | Nordby | 318/227 |
| 4,131,936 | 12/1978 | Gemp | 363/43 |
| 4,159,513 | 6/1979 | Gemp et al. | 363/43 |
| 4,845,418 | 7/1989 | Conner | 318/778 |

FOREIGN PATENT DOCUMENTS

| | | | |
|---|---|---|---|
| 0124406 | 11/1984 | European Pat. Off. | H03G 3/04 |
| 0443585 | 8/1991 | European Pat. Off. | H02P 7/00 |
| 60-213296 | 10/1985 | Japan | H02P 7/628 |

OTHER PUBLICATIONS

Copy of European Search Report for European Patent Application No. 93 10 5526 dated Aug. 11, 1993.

*Primary Examiner*—Thomas M. Dougherty
*Assistant Examiner*—Matthew V. Nguyen
*Attorney, Agent, or Firm*—Finnegan, Henderson, Farabow, Garrett & Dunner

[57] ABSTRACT

A method for setting a plurality of operation constants in an inverter device to control variably the speed of an induction motor, the method which changes a value representing the operation constant on a display stepwise in one direction of increase and decrease due to an operation of at least one constant operation setting key. The method increases the stepwise change of the value gradually corresponding to a continuously increasing time of another setting key operation, and set the value on the display as an aimed value of the operation constant.

8 Claims, 4 Drawing Sheets

METHOD FOR SETTING OPERATION CONSTANTS IN AN INVERTER DEVICE

RELATED APPLICATION

The present application is a continuation-in-part application of U.S. Patent Application Ser. No. 08/041,234 to Masataka Ooji filed on Apr. 1, 1993, now abandoned. The complete disclosure of U.S. patent application Ser. No. 08/041,234 is expressly incorporated by reference.

BACKGROUND OF THE INVENTION

The present invention relates to a method for setting operation constants in an inverter device to variably control the speed of an induction motor.

Conventionally, as an operation constant setting method of this type, there has been known a method in which, when a plurality of operation constants having different setting intervals from each other are set by other setting keys than a ten key respectively provided on an operation panel of an inverter device, only one kind of speed is used as a changing speed of a set value to be set by the setting keys.

However, in the above-mentioned conventional operation constants setting method, on a case that a plurality of operation constants having greatly different setting intervals from each other, of example 0 to 100 and 0 to 10,000, are to be set, if the changing speed of the set value is selected to a constant adjusted in a narrower setting interval, then a required setting time for a constant adjusted in a wider setting interval is increased and, if the changing speed of the set value is selected to the constant adjusted in the wider setting interval, then it is difficult to fractionally set the constant adjusted in the narrower setting interval.

In a conventional inverter, a volume switch and an LED display and the like were provided as sufficient data setting means. Recently, however, as a result of the increasing complexity of equipment using inverters, inverters themselves are becoming more complex, of higher refinement, and are providing multiple functions. Accordingly, a plurality of driving parameters are now required, as is the need to efficiently and quickly set those parameters. The present invention satisfies these needs.

SUMMARY OF THE INVENTION

The present invention is particularly efficient in setting variables with a wide range of possible values. The following are examples:

1. Maximum rotation frequency—in case of a 4P motor, the rotational frequency is in the range of about 1,000 to 3,000 r/min. The maximum rotation frequency displayed may be derived, for example, as shown in FIG. 7.
2. Acceleration or Deacceleration—for a stepwise input, periods of 0 to $N_{max}$ and $N_{max}$ to 0 ($N_{max}=$ maximum output) range in value from 0.1 to 1,200 seconds. FIG. 5 demonstrates the concept.
3. ASR Proportion—a gain parameter corresponding to the torque setting. The parameter ranges from 0.1 to 1,000 times. For high values of this parameter, even with narrow speed deviation, torque output is high. For low values of the parameter, even with wide speed deviation, torque output is low. Thus, the value is set corresponding to the amount of the load to be applied to the motor so as to determine the amount of torque in accordance with FIG. 6.

The present invention aims at eliminating the drawbacks found in the above-mentioned conventional operation constants setting method. Accordingly, it is an object of the invention to provide a method for setting operation constants in an inverter device, in which a plurality of constants respectively having different setting intervals from each other can be set properly and easily.

In attaining the above object, according to the invention, there is provided a method for setting operation constants in an inverter device in which a plurality of operation constants of an inverter device to variably control the speed of an induction motor are set by other setting keys than a ten key. According to the present method, an up key for increasing a set value, a down key for decreasing the set value and a fast feed key, respectively provided on an operation panel of the inverter device, are combined properly to thereby set required constants in a data display portion of the operation panel. In particular, the direction of the set value to be increased or decreased is specified by the up key or down key, an amount of change of the set value to be increased or decreased stepwise every predetermined time is increased at a predetermined ratio in accordance with the increase of the continuous operation time of the fast feed key, or a time required for the stepwise change of the unit amount of the set value during the continuous operation of the up key or down key is decreased at a predetermined ratio in accordance with the increase of the time of the continuous operation.

According to the invention, in setting the required operation contains by other keys than the ten key, the changing speed of the set value in the data display portion of the operation panel is varied by the continuous operation time of the setting keys. In particular, in one case, the amount of change of the set value increased or decreased stepwise every predetermined time is increased in accordance with the increase of the continuous operation time; and, in the other case, the time required for the stepwise change of the unit amount of the set value is decreased in accordance with the increase of the continuous operation time. In either case, when the amount of change or the time approaches the target set value, then the continuous operation by the setting keys is once stopped and the setting operation is then started again where the set value change speed is small, so that the target set value can be reached smoothly and accurately.

In either of the above-mentioned cases, a required operation part is composed of a CPU which receives inputs from the setting keys and outputs the operation data to the data display portion, a ROM which outputs its program storage data to the CPU, and a RAM which transmits and receives the data of the setting constants to and from the CPU.

DETAILED DESCRIPTION OF THE PREFERRED EMBODIMENTS

Figure 1:
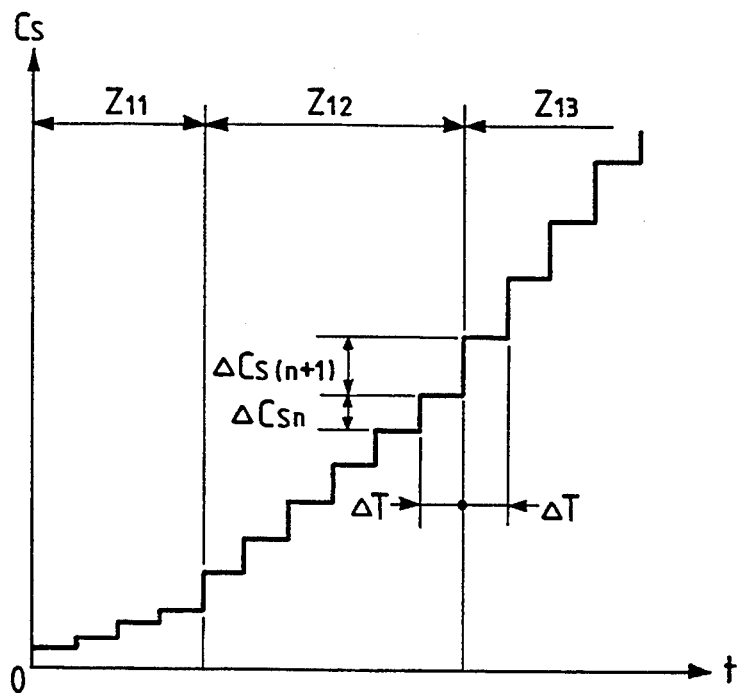
FIG. 1 is a characteristic view of an operation constants setting method of an embodiment according to the invention, showing the characteristic of a set value with respect to a setting key operation time (part 1)
Figure 2:
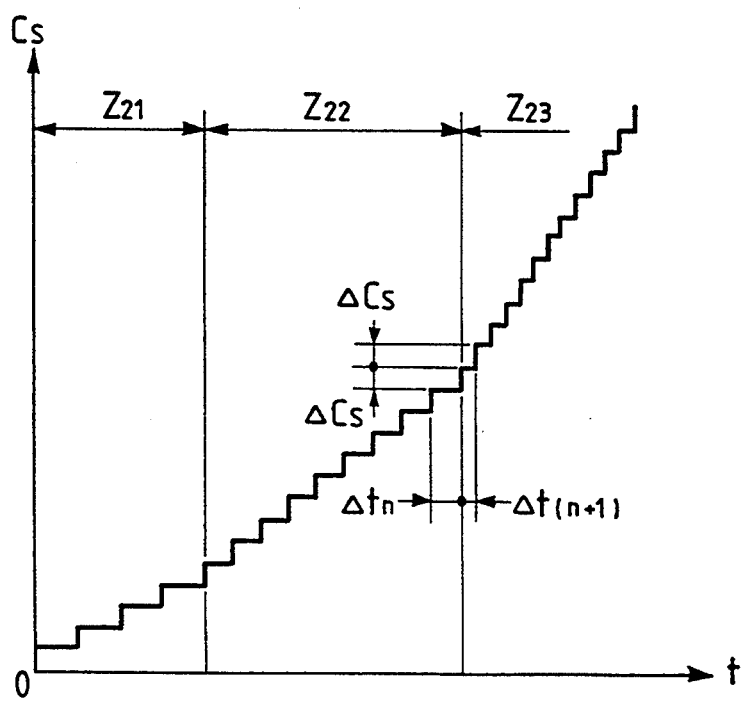
FIG. 2 is a characteristic view of the method of the above embodiment, showing the characteristic of a set value with respect to a setting key operation time (part 2)
Figure 3:
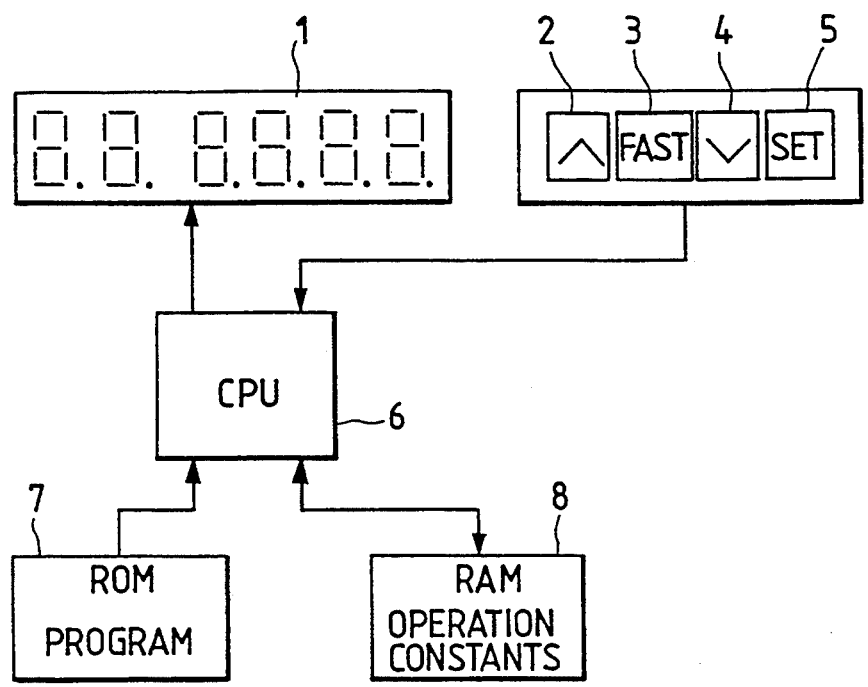
FIG. 3 is a block diagram of an operation constants setting part corresponding to FIG. 1; and, FIG. 4 is a block diagram of an operation constants setting part corresponding to FIG. 2.
Figure 4:
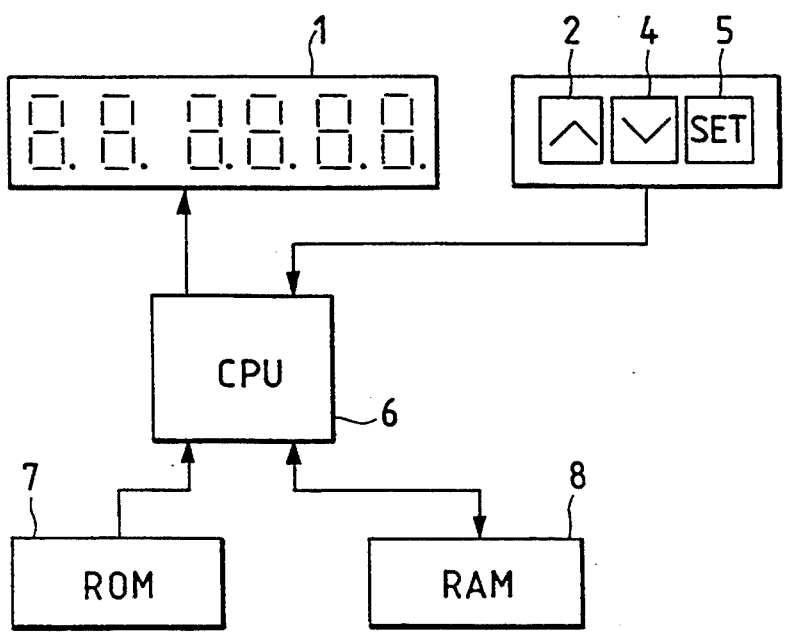
Figure 5:
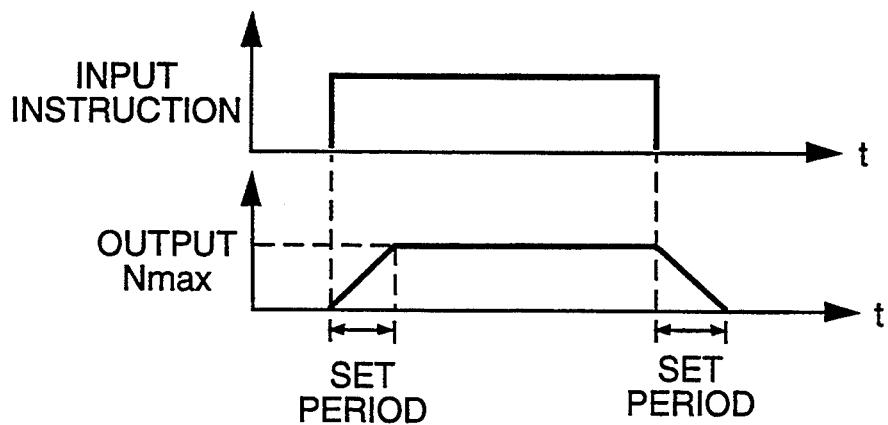
FIG. 5 is a series of graphs showing the acceleration or deacceleration variable's effect.
Figure 6:
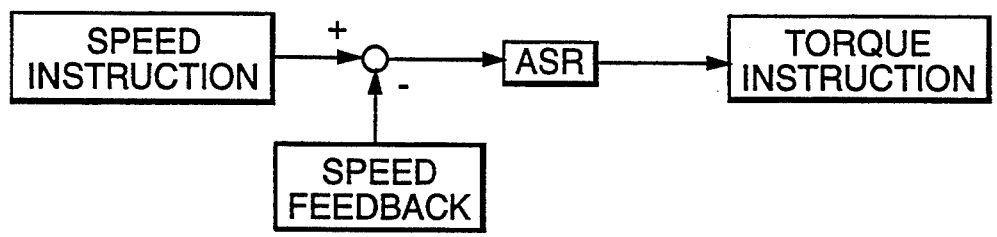
FIG. 6 is a flow diagram showing how the torque setting is arrived at from speed and ASR settings.
Figure 7:
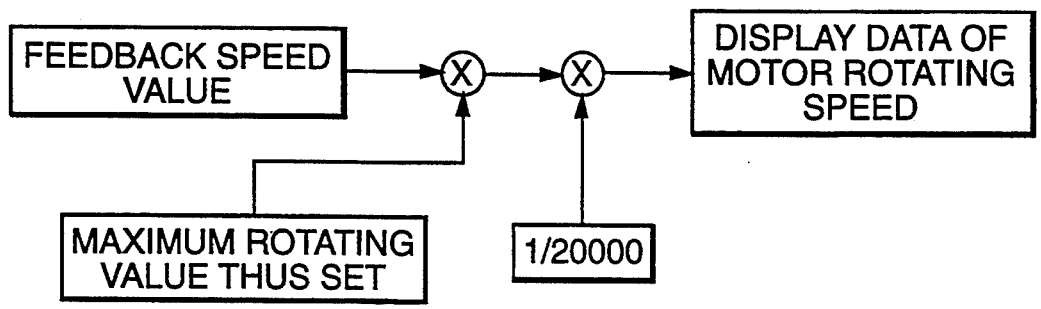
FIG. 7 is a flow diagram showing how the motor rotation setting is arrived at from the maximum rotation frequency and speed settings.

Description will be hereinbelow given of embodiments of a method for setting the operation constants in an inverter device according to the invention with reference to the accompanying drawings. FIGS. 1 and 2 are respectively characteristic views of the set value with respect to setting key operation time. FIGS. 3 and 4 are respectively block circuit diagrams of an operation constant setting part of an inverter device. In FIG. 4, parts having the same function as those shown in FIG. 3 are given the same reference characters.

At first, in FIG. 3, a data display device 1 displays setting data. Various setting keys 2 to 5 are; an up key 2, a fast feed key 3, a down key 4, and a set key 5 for storing the setting data into memory.

Data display—Displays driving conditions, setting parameters, and indicates trouble situations.

Set key—Inputs the value of a displayed parameter into non-volatile memory. If the key is not pushed, the prior setting remains active.

Fast-feed key—Key for fast-feeding the display of possible values for settable parameters. When the fast-feed key is depressed in conjunction with the up key or the down key, fast-feeding of the values is performed. Upon release of the fast-feed key, the feeding speed of possible values returns to normal speed. The fast-feed key, pushed alone, is inoperative.

Figure 8:
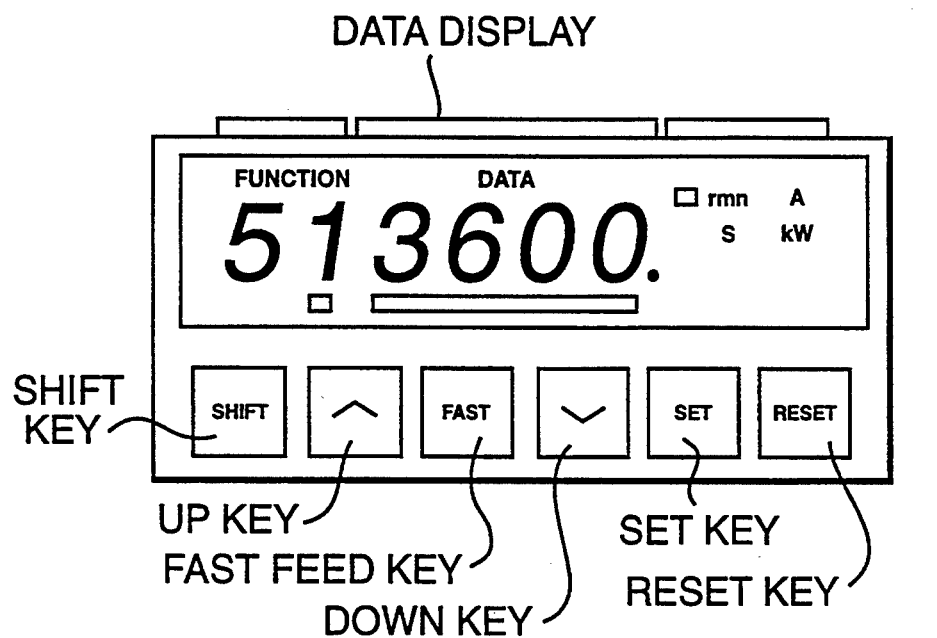
FIG. 8 is a depiction and diagram of showing one embodiment of the claimed invention.
Figure 8:
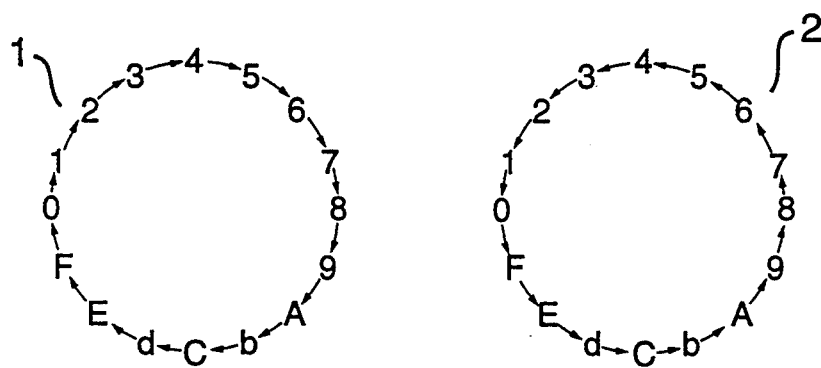

Up key—Key for changing the numeral or code of a particular parameter as shown by settings sequence 1 in FIG. 8. The numerals or codes that are not to be included in the function of the inverter are skipped. The changing numerals are restricted to within the setting range for a particular parameter.

Down key—Key for changing the numeral or code of a particular parameter as shown by settings sequence 2 in FIG. 8. The numerals or codes that are not to be included in the function of the inverter are skipped. The changing numerals are restricted to within the setting range for a particular parameter. Also, a CPU 6 performs a required operation in accordance with the respective setting inputs from the above-mentioned keys, the program instruction from a storage cell or a ROM, and the storage data of a storage cell or a RAM, and outputs a required setting data signal to the data display device 1. It should be noted here that the respective keys are to be operated simultaneously in combination, that is, in combination of the up key 2 and fast feed key 3 or in combination of the down key 4 and fast feed key 3.

Also, in FIG. 4, there is omitted the fast feed key 3 that is shown in FIG. 3.

Next, the characteristic view of the set value relative to the setting key operation time shown in FIG. 1 is a characteristic view of a first embodiment according to the invention. That is, the characteristic view shown in FIG. 1 illustrates the change pattern of the set value $C_s$ with respect to the continuous operation time t of the fast feed key 3 to be operated simultaneously and in combination with the up key 2 or down key 3. In this figure, zones $Z_{11}$, $Z_{12}$, $Z_{13}$, - - - are made to correspond to an increase in the continuous operation time t and, for every zone, the stepwise changing amount $\Delta C_{sn}$ (n=1, 2, 3, - - - ) of the set value $C_s$ every predetermined time $\Delta T$ are increased as $\Delta C_{s1} < \Delta C_{s2} < \Delta C_{s3} < $ - - - .

Also, FIG. 2 is a characteristic view of a second embodiment according to the invention. The characteristic view of FIG. 2 illustrates the change pattern of the set value $C_s$ with respect to the continuous operation time t of the up key 2 or down key 4, in which zones $Z_{21}$, $Z_{22}$, $Z_{23}$, - - - are made to correspond to an increase in the time t and, for every zone, a time $\Delta t_n$ (n=1, 2, 3, - - - ) required to change the unit amount $\Delta C_s$ of the set value $C_s$ is reduced as $\Delta t_1 > \Delta t_2 > \Delta t_3 > $ - - - .

As described above, in either of FIG. 1 or FIG. 2, the change speed of the set value $C_s$ is increased as the continuous operation time t of the setting key is increased. For this reason, in any case, if the set value approaches the target set value, then the continuous operation of the setting keys is once stopped and then the setting operation is started again where the change speed of the set value is small, so that the target set value can be reached smoothly and accurately.

According to the invention, in setting a plurality of operation constants in an inverter device to control variably the speed of an induction motor by other setting keys than a ten key, by means of a combination of an up key for increasing the set value, a down key for decreasing the set value and a fast feed key respectively provided on an operation panel in the inverter device, a setting operation for required constants is performed in the data display portion of the operation panel. A direction to increase or decrease the set value by the up key or down key is specified. The amount of change of the set value increasing or decreasing stepwise every predetermined time is increased at a predetermined ratio in accordance with the increase of the continuous operation time of the fast feed key, or, the up key or down key is operated individually and a time required for the stepwise change of the unit amount of the set value during the continuous operation of the up key or down key is reduced at a predetermined ratio in accordance with the increase of the continuous operation. Thanks to this, in setting a plurality of operation constants having different set value change intervals from each other, the respective constants can be set easily and accurately at proper setting times, respectively.

What is claimed is:

1. A control system for setting operation constants in an inverter device, the inverter device variably controlling the speed of an induction motor, said control system comprising:

a display for displaying the current value of the operation constants;

an up key for increasing an increment constant corresponding to a motor operation constant increase made after a time interval;

a down key for decreasing an increment constant corresponding to a motor operation constant decrease made after a time interval;

a fast feed key for increasing the speed at which possible increment constants are displayed; and a set key for setting the displayed increment constant for the motor operation constant.

2. The control system of claim 1, wherein a central processing unit receives inputs from the keys and outputs the value of the operation constants to the display, a ROM storing program instructions outputs those instructions to the central processing unit, and a RAM outputs and inputs operation constant values to and from the central processing unit.

3. A control system for setting operation constants in an inverter device, the inverter device variably controlling the speed of an induction motor, said control system comprising:

display means for displaying the current value of the operation constants;

first input means for increasing or decreasing an increment constant corresponding to a motor operation constant increase or decrease made after a time interval;

second input means for increasing the speed at which possible increment constants are displayed by the display means; and third input means for setting the displayed increment constant for the motor operation constant.

4. The control system of claim 3, wherein a central processing unit receives inputs from the first, second, and third input means and outputs the value of the operation constants to the display means, a ROM storing program instructions outputs those instructions to the central processing unit, and a RAM outputs and inputs operation constant values to and from the central processing unit.

5. The control system of claim 3, wherein the operation constants include a maximum rotation frequency of the induction motor.

6. The control system of claim 3, wherein the operation constants include an acceleration or deceleration of the induction motor.

7. The control system of claim 3, wherein the operation constants include an ASR proportion.

8. The control system of claim 3, wherein the display means comprises a liquid crystal display.

* * * * *